(12) United States Patent
Banginwar et al.

(10) Patent No.: US 7,570,259 B2
(45) Date of Patent: Aug. 4, 2009

(54) SYSTEM TO MANAGE DISPLAY POWER CONSUMPTION

(75) Inventors: Rajesh Banginwar, Hillsboro, OR (US); Eugene Gorbatov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 795 days.

(21) Appl. No.: 10/858,363

(22) Filed: Jun. 1, 2004

(65) Prior Publication Data

US 2005/0289360 A1 Dec. 29, 2005

(51) Int. Cl.
*G09G 5/00* (2006.01)
(52) U.S. Cl. .................. 345/211; 345/204; 345/156; 345/171; 345/629
(58) Field of Classification Search .......... 345/211, 345/204, 156, 157, 171, 173, 82, 418, 419, 345/473, 902, 629, 184, 835, 88, 89, 94, 345/98; 315/149; 715/835, 761; 713/320–324, 713/300, 2, 322, 175, 232, 1, 168; 257/64, 257/69; 717/175; 709/200; 455/426.2; 365/63
See application file for complete search history.

(56) References Cited

U.S. PATENT DOCUMENTS

| | | | | |
|---|---|---|---|---|
| 4,088,980 | A * | 5/1978 | Tanigawa et al. ............ 340/461 |
| 4,378,557 | A * | 3/1983 | Murata ......................... 345/94 |
| 5,023,236 | A | 6/1991 | Edgington et al. |
| 5,491,704 | A * | 2/1996 | Duron ......................... 714/758 |
| 5,781,783 | A * | 7/1998 | Gunther et al. ............. 713/320 |
| 5,843,442 | A | 12/1998 | Soule et al. |
| 5,866,542 | A | 2/1999 | Vlasuk et al. |
| 5,987,614 | A * | 11/1999 | Mitchell et al. ............. 713/300 |
| 6,005,549 | A * | 12/1999 | Forest ......................... 345/157 |
| 6,088,794 | A * | 7/2000 | Yoon et al. ...................... 713/2 |
| 6,115,823 | A * | 9/2000 | Velasco et al. .............. 713/322 |
| 6,151,652 | A * | 11/2000 | Kondo et al. ................ 713/300 |
| 6,333,750 | B1 * | 12/2001 | Odryna et al. .............. 345/629 |
| 6,351,850 | B1 * | 2/2002 | van Gilluwe et al. ........ 717/175 |
| 6,429,840 | B1 * | 8/2002 | Sekiguchi ..................... 345/88 |
| 6,509,911 | B1 * | 1/2003 | Shimotono .................. 715/761 |

(Continued)

FOREIGN PATENT DOCUMENTS

WO WO 02/062778 8/2002

(Continued)

OTHER PUBLICATIONS

Carson, S.D. et al., "The role of tissue factor in the production of thrombin", Blood Coagulation and Fibrinolysis, vol. 4, pp. 281-292 (1993).

(Continued)

*Primary Examiner*—Prabodh M Dharia
(74) *Attorney, Agent, or Firm*—Buckley, Maschoff & Talwalkar LLC

(57) ABSTRACT

Some embodiments involve determination of a first characteristic associated with a first interface displayed by a display, and determination of a second characteristic associated with a second interface displayed by the display. Embodiments may further involve determination of a first power consumption mode for the first interface based at least on the first characteristic, and determination of a second power consumption mode for the second interface based at least on the second characteristic, wherein the first power consumption mode is different from the second power consumption mode.

27 Claims, 8 Drawing Sheets

U.S. PATENT DOCUMENTS

| | | | |
|---|---|---|---|
| 6,640,145 B2 * | 10/2003 | Hoffberg et al. | 700/83 |
| 6,677,991 B1 * | 1/2004 | Ito | 348/220.1 |
| 6,704,875 B1 * | 3/2004 | Kinoshita et al. | 713/300 |
| 6,763,226 B1 * | 7/2004 | McZeal, Jr. | 455/90.2 |
| 6,771,250 B1 * | 8/2004 | Oh | 345/156 |
| 7,006,881 B1 * | 2/2006 | Hoffberg et al. | 700/83 |
| 7,017,053 B2 * | 3/2006 | Mizuyabu et al. | 713/300 |
| 7,020,786 B2 * | 3/2006 | Vyssotski et al. | 713/300 |
| 7,027,032 B2 * | 4/2006 | Rosenberg et al. | 345/156 |
| 7,036,032 B2 * | 4/2006 | Mizuyabu et al. | 713/323 |
| 7,114,086 B2 * | 9/2006 | Mizuyabu et al. | 713/320 |
| 7,130,807 B1 * | 10/2006 | Mikurak | 705/7 |
| 7,161,590 B2 * | 1/2007 | Daniels | 345/204 |
| 7,166,966 B2 * | 1/2007 | Naugler et al. | 315/149 |
| 7,181,370 B2 * | 2/2007 | Furem et al. | 702/188 |
| 7,190,338 B2 * | 3/2007 | Kubota et al. | 345/89 |
| 7,243,246 B2 * | 7/2007 | Allen et al. | 713/300 |
| 7,339,570 B2 * | 3/2008 | Kubota et al. | 345/98 |
| 7,343,484 B2 * | 3/2008 | Du et al. | 713/2 |
| 2002/0040442 A1 * | 4/2002 | Ishidera | 713/300 |
| 2002/0075249 A1 * | 6/2002 | Kubota et al. | 345/204 |
| 2002/0091991 A1 * | 7/2002 | Castro | 717/106 |
| 2003/0051183 A1 * | 3/2003 | Lo et al. | 713/323 |
| 2003/0059020 A1 * | 3/2003 | Meyerson et al. | 379/219 |
| 2003/0103088 A1 * | 6/2003 | Dresti et al. | 345/835 |
| 2003/0160239 A1 * | 8/2003 | Shinagawa et al. | 257/64 |
| 2003/0169247 A1 * | 9/2003 | Kawabe et al. | 345/204 |
| 2003/0188144 A1 * | 10/2003 | Du et al. | 713/1 |
| 2004/0236969 A1 * | 11/2004 | Lippert et al. | 713/300 |
| 2004/0259542 A1 * | 12/2004 | Viitamaki et al. | 455/426.2 |
| 2005/0071698 A1 * | 3/2005 | Kangas | 713/300 |
| 2005/0086280 A1 * | 4/2005 | Thuerk | 709/200 |
| 2005/0134578 A1 * | 6/2005 | Chambers et al. | 345/184 |
| 2005/0138437 A1 * | 6/2005 | Allen et al. | 713/300 |
| 2005/0240538 A1 * | 10/2005 | Ranganathan | 705/400 |
| 2005/0243588 A1 * | 11/2005 | Kubota et al. | 365/63 |
| 2005/0263765 A1 * | 12/2005 | Maekawa | 257/69 |
| 2006/0250377 A1 * | 11/2006 | Zadesky et al. | 345/173 |
| 2006/0265609 A1 * | 11/2006 | Fung | 713/300 |
| 2007/0094525 A1 * | 4/2007 | Uguen et al. | 713/300 |
| 2007/0146354 A1 * | 6/2007 | Kubota et al. | 345/204 |
| 2008/0016468 A1 * | 1/2008 | Chambers et al. | 715/835 |
| 2008/0126803 A1 * | 5/2008 | Ginter et al. | 713/168 |

FOREIGN PATENT DOCUMENTS

| | | |
|---|---|---|
| WO | WO 02/064578 | 8/2002 |
| WO | WO 02/064598 | 8/2002 |
| WO | WO 02/064599 | 8/2002 |

OTHER PUBLICATIONS

Colman, R.W., Chapter 6: "Contact Activation Pathway: Inflammatory, Fibrinolytic, Anticoagulant, Antiadhesive, and Antiangiogenic Activities", Hemostasis and Thrombosis: Basic Principles and Clinical Practice, Fourth Edition, Lippincott Williams & Wilkins, publ., Colman, R.W. et al., eds., pp. 103-121 (2001).

Girard, T.J. et al., "The role of tissue factor/factor VIIa in the pathophysiology of acute thrombotic formation", Current Opinion in Pharmacology, vol. 1, pp. 159-163 (2001).

Schmaier, A.H., Chapter 5: "Contact Activation", Thrombosis and Hemorrhage, Second Edition, Williams & Wilkins, publ., Loscalzo, J. et al., eds., pp. 105-127 (1998).

* cited by examiner

DETERMINE A FIRST CHARACTERISTIC ASSOCIATED WITH A FIRST INTERFACE DISPLAYED BY A DISPLAY AND A SECOND CHARACTERISTIC ASSOCIATED WITH A SECOND INTERFACE DISPLAYED BY THE DISPLAY
302

DETERMINE A FIRST POWER CONSUMPTION MODE FOR THE FIRST INTERFACE BASED AT LEAST ON THE FIRST CHARACTERISTIC AND A SECOND POWER CONSUMPTION MODE FOR THE SECOND INTERFACE BASED AT LEAST ON THE SECOND CHARACTERISTIC
304

FIG. 3

| APPLICATION | ACTIVITY MEASURE ALGORITHM |
|---|---|
| GENERIC | AM = Z-ORDER; USER-SELECTED = 1 |
| WORD PROCESSOR | FOCUS = 1; OTHERS = 5 |
| PRESENTATION | USED < 10s = 1; 10s ? USED < 20s = 5; USED ? 20s = 10 |

| APPLICATION | POWER CONSUMPTION MODE ALGORITHM |
|---|---|
| GENERIC | AM < 5, PCM = 1; AM ≥ 5, PCM = 3 |
| WORD PROCESSOR | PCM = AM |
| E-MAIL | AM < 10, PCM = 1; AM ≥ 10, PCM = 2 |

FIG. 8

SYSTEM TO MANAGE DISPLAY POWER CONSUMPTION

BACKGROUND

During operation, a computing system consumes power from a power source. A mobile computing system may be designed to consume power from a portable and exhaustible power source, such as a battery. In order to prolong periods of mobile use, such a computing system may include elements designed to limit the amount of power consumed thereby.

These elements may include hardware and/or software for providing a low-power state during a period of relative inactivity. For example, a computing system might automatically enter a sleep state when not being used in order to reduce power consumption. Entering the sleep state may include reducing the brightness of a display, turning off a hard disk, and/or placing a processor in an idle state. As a result, energy can be conserved and/or battery life may be extended.

Some displays, such as Organic Light-Emitting Diode (OLED) displays, may be controlled such that one portion of a display consumes less power than other portions of the display. Conventional power-conserving techniques exploit this feature by displaying a user-selected window (or, alternatively, a window having "focus") using a display method that is more power-consuming than the display method used to display other simultaneously-displayed windows.

BRIEF DESCRIPTION OF THE DRAWINGS

FIG. 3 is a flow diagram of a method according to some embodiments.

FIG. 6 illustrates a portion of an activity measure algorithm table according to some embodiments.

FIG. 8 illustrates a portion of power consumption mode algorithm table according to some embodiments.

DETAILED DESCRIPTION

Figure 1:
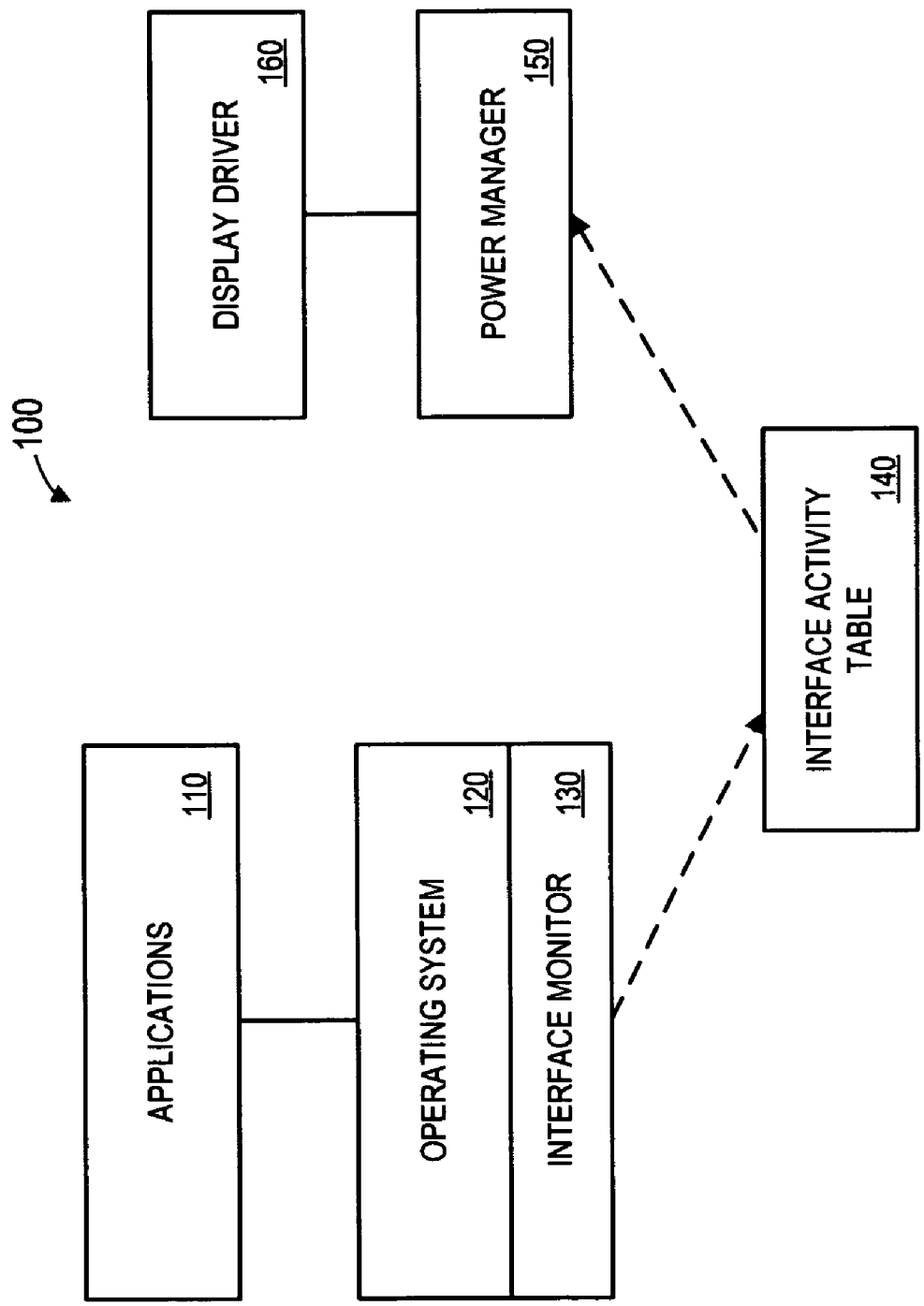
FIG. 1 is a block diagram of software components according to some embodiments.

FIG. 1 is a block diagram of software components of system 100 according to some embodiments. System 100 includes applications 110, operating system 120, interface monitor 130, interface activity table 140, power manager 150, and display driver 160. The components of system 100 may operate to provide different power consumption modes for different displayed interfaces based on characteristics of the displayed interfaces.

Applications 110 may include any applications which provide one or more displayed interfaces. Examples of applications 110 include, but are not limited to, a word processing application, a spreadsheet application, an e-mail client, a calendaring application, gaming applications, presentation applications, and drawing applications. One or more of applications 110 may provide "window"-type interfaces.

Applications 110 may communicate with operating system 120. Operating system 120 may control hardware components of a system in which system 100 resides based on instructions from applications 110. Operating system 120 may instruct a display (not shown) to display one or more interfaces that are associated with one or more of applications 110. In some embodiments, operating system 120 may comprise a "windowing" operating system such as Windows XP™ and/or OS X™.

Interface monitor 130 may determine characteristics associated with the displayed interfaces. The characteristics may be used to determine an activity measure for each of the displayed interfaces. The above determinations will be described in detail below. Interface monitor 130 may comprise a filter object that monitors messages received and/or transmitted by operating system 120. Interface monitor 130 may be embodied as a service, layer, and/or core component of operating system 120. Interface monitor 130 may also be embodied as any other executable software component, including a dynamic link library or a stand-alone application.

The determined activity measures are stored in interface activity table 140. According to some embodiments, interface activity table 140 associates each displayed interface with an activity measure. Interface activity table 140 may be stored in one or more storage media, including but not limited to registers, random access memory, cache memory, and hard disk memory.

Power manager 150 may determine an activity measure associated with an interface from interface activity table 140 and may determine a power consumption mode based on the activity measure. Such determinations will also be described in detail below. Power manager 150 may be embodied as a service, layer, and/or core component of operating system 120, and/or as any other executable software component, including a dynamic link library or a stand-alone application.

Power manager 150 may instruct display driver 160 to control a display to display a first interface according to a first power consumption mode and to display a second interface according to a second power consumption mode. In this regard, display driver 160 may comprise a device driver suitable to control a display that is coupled to a system in which system 100 resides. Display driver 160 may also receive instructions directly from operating system 120.

Figure 2:
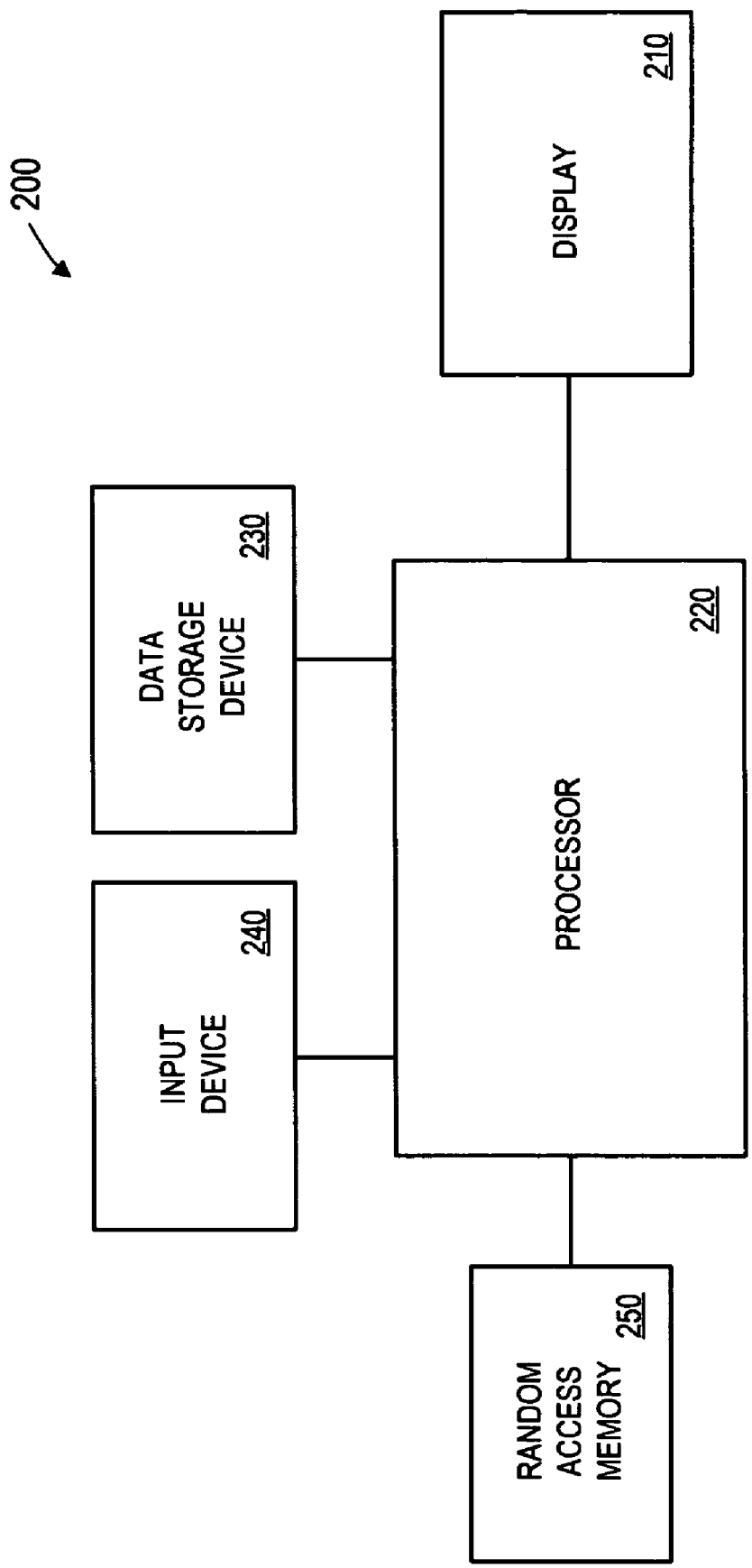
FIG. 2 is a block diagram of hardware components according to some embodiments.

FIG. 2 is a block diagram of system 200 according to some embodiments. System 200 may embody the software components of FIG. 1. System 200 may comprise any device or devices, including but not limited to a laptop computer, a cellular phone, a personal digital assistant, a personal computer, and a standalone display.

Initially, display 210 may comprise a display capable of displaying a first interface according to a first power consumption mode and a second interface according to a second power consumption mode. In some examples, display 210 may display a first interface at a first brightness, a first resolution, a first color, and a first refresh rate, and may display a second interface that differs from the first interface with respect to one or more of brightness, resolution, color, and refresh rate. Display 210 may comprise an organic light-emitting diode-based display.

Processor 220 may comprise a Pentium, RISC-based, or other type of processor and is used to execute processor-executable process steps so as to control the elements of system 200 to provide desired functionality. The processor-executable process steps may comprise steps of applications 110, operating system 120, interface monitor 130, power manager 150, and display driver 160.

The processor-executable process steps may be stored in data storage device 230, which may comprise one or more hard disks. The process steps may be read from a computer-readable medium, such as a floppy disk, a CD-ROM, a DVD- ROM, a Zip™ disk, a magnetic tape, or a signal encoding the process steps, and thereafter stored in data storage device 230 in a compressed, uncompiled and/or encrypted format. In alternative embodiments, hard-wired circuitry may be used in place of, or in combination with, processor-executable process steps for implementation of the processes described herein. Thus, embodiments are not limited to any specific combination of hardware and software.

Data storage device 230 may also store interface activity table 140. In addition, data storage device 230 may store other unshown elements that may be necessary for operation of system 200, such as data files and other device drivers.

Input device 240 may comprise any known device for capturing user input, including a keyboard, mouse, touch pad, voice-recognition system, or any combination of these devices. In some embodiments, process steps of interface monitor 130 are executed by processor 220 to determine an activity measure for an interface based on user input to the interface.

Memory 250 may provide processor 220 with fast data storage and retrieval. Memory 250 may comprise any type of memory for storing data, such as a Single Data Rate Random Access Memory, a Double Data Rate Random Access Memory, or a Programmable Read Only Memory. Processor-executable process steps being executed by processor 220 are typically stored temporarily in memory 250 and executed therefrom by processor 220. Interface activity table 140 may also be stored in memory 250 according to some embodiments.

FIG. 3 is a flow diagram of a method according to some embodiments. The method of FIG. 3 may be associated with, for example, systems such as those described with respect to FIGS. 1 and/or 2. Note that any of the methods described herein may be performed by hardware, software (including microcode), or a combination of hardware and software. For example, a storage medium may store thereon instructions that when executed by a machine results in performance according to any of the embodiments described herein.

At 302, a first characteristic associated with a first interface displayed by a display is determined, and a second characteristic associated with a second interface displayed by the display is determined. According to some embodiments of 302, the characteristics determined by interface monitor 130 include operating system messages to draw an interface, a Z-order of an interface, a movement of a pointer within an interface, an elapsed time from when the interface was manipulated by a user via input device 240, and/or an elapsed time from when the interface possessed "focus". Any other characteristics associated with a displayed interface may be determined at 302 in some embodiments. Non-exhaustive examples of such characteristics include screen size, screen position of an interface, application that owns the screen, history of screen usage, current system location, user ID, ambient light reading, remaining battery life, battery discharge rate, and user power profile.

In some embodiments, interface monitor 130 exposes an application programming interface. One or more of applications 110 may use the application programming interface to provide interface monitor 130 with characteristics of displayed interfaces that are associated with the one or more of applications 110. For example, an application may indicate that it expects to be active at a given time and/or for a given period of time. An application may also or alternatively use the application programming interface to indicate to interface monitor 130 that a displayed interface associated with the application should be displayed according to a least power-consumptive mode.

According to some embodiments, interface monitor 130 stores an indication of the determined characteristics in interface activity table 140.

At 304, a first power consumption mode is determined for the first interface based at least on the first characteristic determined at 302. A second power consumption mode for the second interface is also determined at 304 based at least on the second characteristic determined at 302. Power manager 150 may determine the first and second power consumption modes based on the characteristics stored in interface activity table 140.

In one example of 304, power manager 150 determines each power consumption mode to be equal to a Z-order determined at 302. More specifically, the determined first power consumption mode is equal to "one" if the determined first characteristic is a Z-order of one. Accordingly, the determined second power consumption mode is equal to "three" if the determined second characteristic is a Z-order of three. A power consumption mode of "one" may be more or less power-consumptive than a power consumption mode of "three", depending on the specific embodiment.

The FIG. 3 method may thereby provide efficient determination of power consumption modes to be applied to various displayed interfaces.

Figure 4:
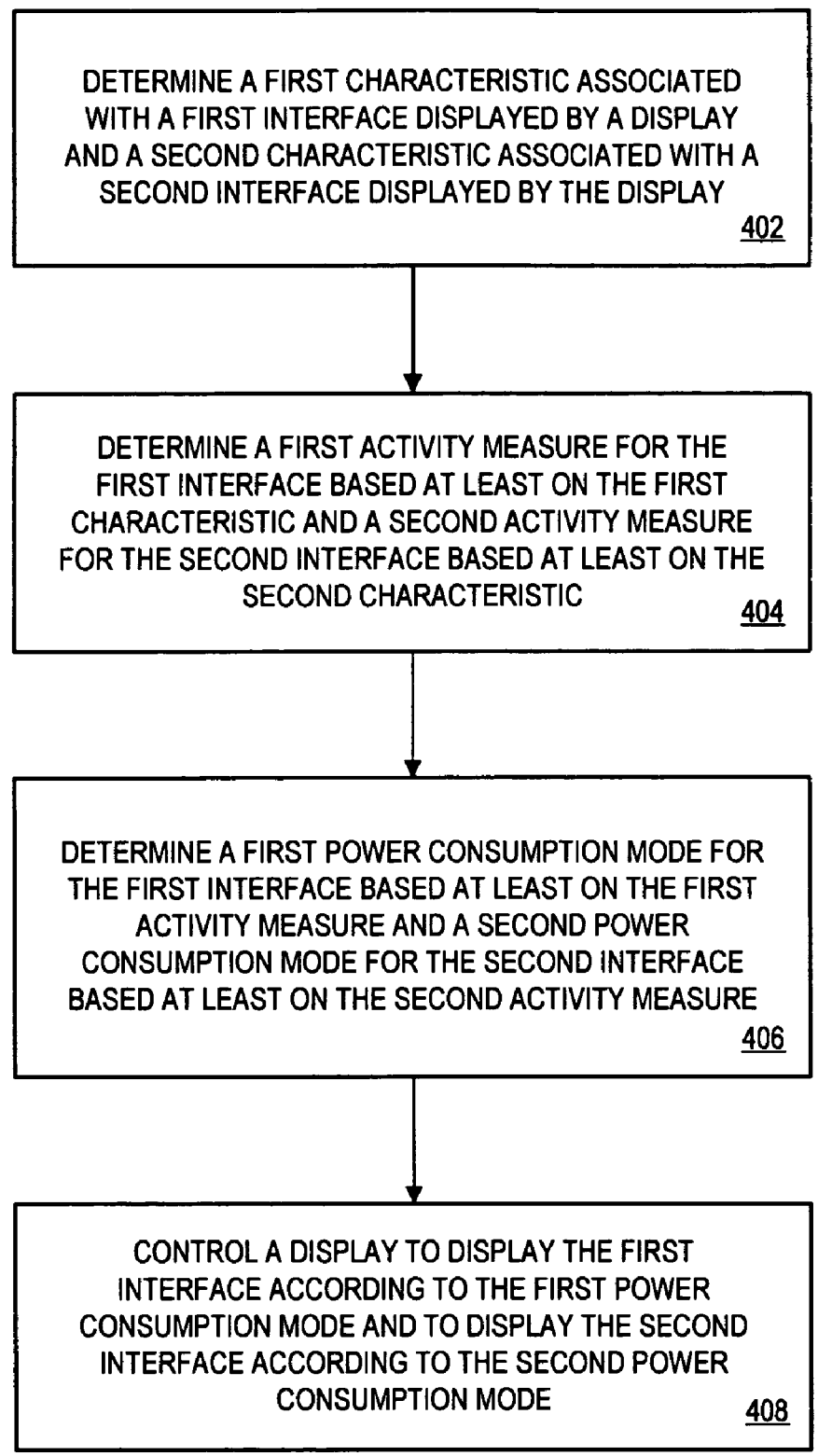
FIG. 4 is a flow diagram of a method according to some embodiments.

FIG. 4 is a flow diagram of a method according to some embodiments. The method of FIG. 4 may also be associated with systems such as those described with respect to FIGS. 1 and/or 2. The FIG. 4 method may be used to control a display to simultaneously display different interfaces according to different power consumption modes.

At 402, a first characteristic associated with a first interface displayed by a display is determined, and a second characteristic associated with a second interface displayed by the display is determined. The characteristics may be determined by interface monitor 130, and may comprise any characteristics, including those examples provided with respect to FIG. 3.

Figure 5:
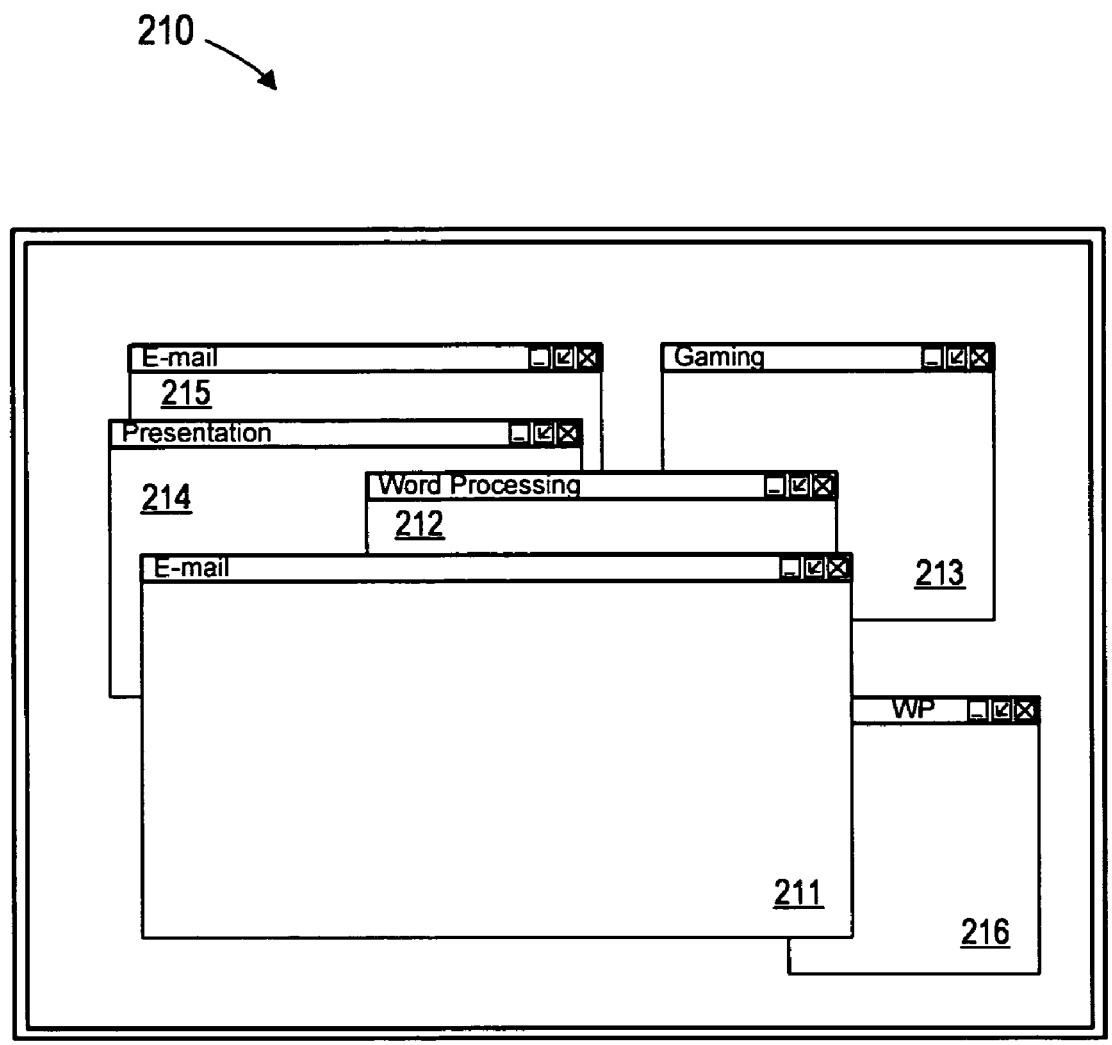
FIG. 5 is an outward view of a display displaying interfaces according to some embodiments.

FIG. 5 is an outward view of display 210 according to some embodiments. Display 210 displays interfaces 211 through 216. Interfaces 211 through 216 are associated with "Z-orders" of 1 through 6, respectively. Furthermore, interfaces 211 and 215 are associated with an e-mail client, interfaces 212 and 216 are associated with a word processing application, interface 213 is associated with a gaming application, and interface 214 is associated with a presentation application. For purposes of the present example, it will be assumed that the above-mentioned first interface and second interface correspond to window 211 and window 214, respectively.

At 404, a first activity measure is determined for the first interface based at least on the first characteristic, and a second activity measure is determined for the second interface based at least on the second characteristic. Interface monitor 130 may determine the first and second activity measures at 404 according to some embodiments.

The activity measures may be determined based on some or all of the determined characteristics and/or may be determined according to a generic algorithm that is applicable to all displayed interfaces. For example, an activity measure associated with an interface may simply be equal to the Z-order of the interface. In another example, a particular activity measure may be determined for an interface that has been recently active, while a lower activity measure may be determined for an interface that has been inactive during the recent period. Other embodiments for determining activity measures may include the use of exponential average or Markov decision processes to predict user behavior and anticipate an inactivity duration for a displayed interface.

According to some embodiments of 404, an activity measure associated with an interface is determined by determining an application associated with the interface, determining an activity measure algorithm associated with the application, and applying the activity measure algorithm to the characteristics determined with respect to the interface. FIG. 6 illustrates a portion of activity measure algorithm table 600 according to some of the foregoing embodiments. Activity measure algorithm table 600 may be stored in one or more storage media, including but not limited to memory 250 and data storage device 230.

Activity measure algorithm table 600 associates application types with activity measure algorithms. The activity measure algorithms may be based on one or more of any factor, including but not limited to interface characteristics of the type determined at 402. The activity measure algorithms may, for instance, be based on specific actions executed by a subject interface (e.g., user selection of a File/Open command within an interface). Activity measure algorithm table 600 may be used to determine an activity measure algorithm as previously described.

For example, interface monitor 130, in some embodiments of 404, determines an application associated with the first interface and an application associated with the second interface. An activity measure algorithm associated with each application is then determined using table 600. In the present example, interface monitor 130 determines that the first interface (window 211) is associated with an e-mail application and determines that the second interface (window 214) is associated with a presentation application. Next, interface monitor 130 determines that the algorithm "AM=Z-Order" is associated with window 211 and determines that the algorithm "USED<10s=1; 10s≦USED<20s=5; USED≧20s=10" is associated with window 214.

Interface monitor 130 may then determine activity measures for the first and second interfaces by applying the activity measure algorithm associated with an interface to characteristics determined for the interface. Continuing with the above example, the activity measure determined for window 211 is "1", which is equal to its associated Z-order. It will be assumed that, at 402, it is determined that window 214 was last used between 10 and 20 seconds from the present moment. Accordingly, the activity measure determined for window 214 at 404 is "5".

Figure 7:
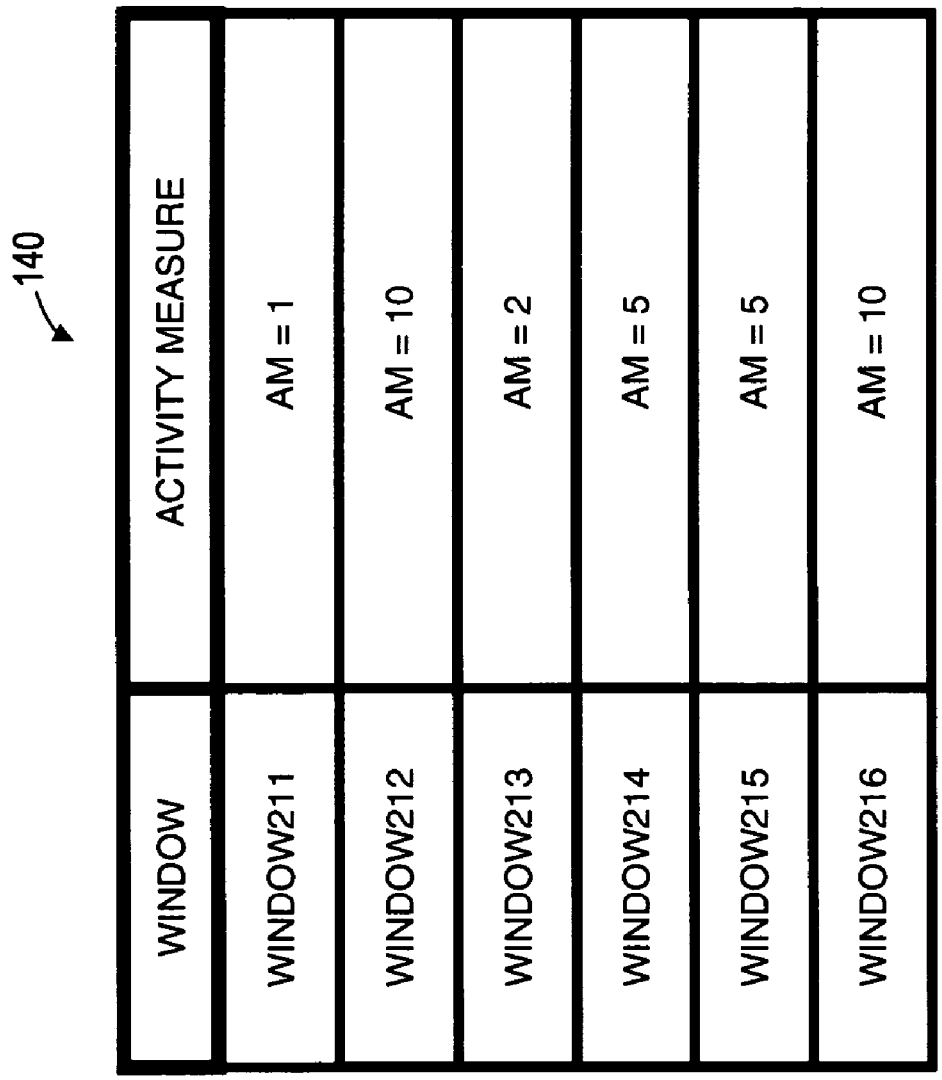
FIG. 7 illustrates a portion of an interface activity table according to some embodiments.

Interface monitor 130 may store the determined activity measures in interface activity table 140. FIG. 7 is a tabular representation of a portion of interface activity table 140 according to some embodiments. As mentioned above, interface activity table 140 may be stored in one or more storage media, including but not limited to memory 250 and data storage device 230.

The tabular representation associates each of windows 211 through 216 with an activity measure. In this regard, an activity measure associated with each of windows 211 through 216 may be determined at 404. The FIG. 4 method is therefore not limited to a first and a second interface. In some embodiments, the display of three or more interfaces may be controlled according to the FIG. 4 method.

Returning to FIG. 4, a first power consumption mode is determined at 406 for the first interface based at least on the first activity measure, and a second power consumption mode is determined for the second interface based at least on the second activity measure. Power manager 150 may determine the first and second power consumption modes based on the activity measures stored in interface activity table 140.

Power manager 150 may use any method for determining a power consumption mode for an interface based on an activity measure associated with the interface. In some embodiments of 406, power manager 150 determines an application associated with an interface, determines a power consumption mode algorithm associated with the application, and applies the power consumption mode algorithm to an activity measure associated with the interface.

FIG. 8 illustrates a portion of power consumption mode algorithm table 800 according to some embodiments. Power consumption mode algorithm table 800 may be stored in one or more storage media within or external to system 200.

Power consumption mode algorithm table 800 associates application types with power consumption mode algorithms. The power consumption mode algorithms may be based on one or more of any factor, including but not limited to activity measures. The power consumption mode algorithms may, like the activity measure algorithms mentioned above, be based on specific actions executed by a subject interface (e.g., user selection of a "New Message" command within an interface of an E-mail client).

According to some embodiments of 406, power manager 150 initially determines an application associated with the first interface and an application associated with the second interface. A power consumption mode algorithm associated with each application is then determined using power consumption mode algorithm table 800. Returning to the present example, power manager 150 determines that the first interface (window 211) is associated with an e-mail application and determines that the second interface (window 214) is associated with a presentation application. Power manager 150 then determines that the algorithm "AM<10, PCM=1; AM≧10, PCM=2" is associated with window 211 and determines that the algorithm "AM<5, PCM=1; AM≧5, PCM=3" is associated with window 214.

Power manager 150 may then determine power consumption modes for the first and second interfaces by applying the power consumption mode algorithm associated with an interface to an activity measure determined for the interface. For example, power manager 150 determines, from interface activity table 140, that an activity measure associated with window 211 is "1". Applying the above-mentioned algorithm results in a power consumption mode (PCM) of 1 for window 211. An activity measure associated with window 214 is "5", therefore the PCM for window 214 is determined to be 3.

At 408, a display is controlled to display the first interface according to the first power consumption mode and to display the second interface according to the second power consumption mode. The first and second power consumption modes may comprise any modes that consume different amounts of power. According to some embodiments of 408, power manager 150 instructs display driver 160 to display window 211 according to power consumption mode 1 and to display window 214 according to power consumption mode 3. As a result, display driver 160 controls display 210 to display the first interface according to the first power consumption mode and to display the second interface according to the second power consumption mode. The interfaces may be immediately displayed according to their associated power consumption mode or may gradually change from their current mode.

Power consumption mode 1 may, for example, be associated with a first brightness, a first color, a first resolution and/or a first refresh rate. On the other hand, power consumption mode 3 may be associated with a second brightness, a second color, a second resolution and/or a second refresh rate. One or more of the first brightness, the first color, the first resolution and/or the first refresh rate may be identical to respective ones of the second brightness, the second color, the second resolution and/or the second refresh rate. A power consumption mode according to some embodiments may be associated with power-related display features other than those described above.

According to some embodiments of the FIG. 4 method, flow passes directly from 402 to 406. The power consumption modes are determined at 406 based on the characteristics determined at 402 in some of these embodiments. Accordingly, power consumption mode algorithms that may be used in these embodiments may be based on interface characteristics rather than on activity measures.

The FIG. 4 method may provide acceptable display power consumption and display quality.

The several embodiments described herein are solely for the purpose of illustration. Persons skilled in the art will recognize from this description other embodiments may be practiced with modifications and alterations limited only by the claims.

What is claimed is:

1. A method comprising:
    determining a first characteristic associated with a first interface displayed by a display, and a second characteristic associated with a second interface displayed by the display; and
    determining a first power consumption mode for the first interface based at least on the first characteristic, and a second power consumption mode for the second interface based at least on the second characteristic,
    wherein the first power consumption mode is different from the second power consumption mode;
    wherein the first interface is displayed at a time that the second interface is also displayed;
    wherein determining the first power consumption mode comprises:
        determining an activity measure for the first interface based on user input to the first interface; and
        determining the first power consumption mode based on the activity measure for the first interface; and
    wherein determining the second power consumption mode comprises:
        determining an activity measure for the second interface based on user input to the second interface; and
        determining the second power consumption mode based on the activity measure for the second interface.

2. A method according to claim 1, wherein determining the first power consumption mode based on the activity measure for the first interface comprises:
    determining an application associated with the first interface;
    determining a power consumption mode algorithm associated with the application; and
    applying the power consumption mode algorithm to the activity measure for the first interface.

3. A method according to claim 1, further comprising:
    controlling the display to display the first interface according to the first power consumption mode and to display the second interface according to the second power consumption mode.

4. A method according to claim 1, wherein the first characteristic comprises one or more of: a Z-order of the first interface on the display; a pointer movement within the first interface; an operating system message to draw the first interface; an elapsed time from when the first interface was manipulated by a user; screen size; screen position of an interface; application that owns the screen; history of screen usage; current system location; user ID; ambient light reading; remaining battery life; battery discharge rate; and user power profile; and an elapsed time from when the first interface possessed focus.

5. A method according to claim 1,
    wherein the first power consumption mode is associated with one or more of a first brightness, a first resolution, a first color, and a first refresh rate; and
    wherein the second power consumption mode is associated with one or more of a second brightness, a second resolution, a second color, and a second refresh rate.

6. A method according to claim 5,
    wherein one or more of the first brightness, the first resolution, and the first color is identical to one or more respective ones of the second brightness, the second resolution, and the second color.

7. Processor-executable process steps embodied in a medium, the process steps comprising steps to provide:
    an interface monitor to determine a first characteristic associated with a first interface displayed by a display, and to determine a second characteristic associated with a second interface displayed by the display; and
    a power manager to determine a first power consumption mode for the first interface based at least on the first characteristic, and to determine a second power consumption mode for the second interface based at least on the second characteristic; and
    wherein the first interface is displayed at a time that the second interface is also displayed;
    the power manager to determine an activity measure for the first interface based on user input to the first interface, to determine the first power consumption mode based on the activity measure for the first interface; to determine an activity measure for the second interface based on user input to the second interface, and to determine the second power consumption mode based on the activity measure for the second interface.

8. Processor-executable process steps according to claim 7, wherein the first characteristic is different from the second characteristic.

9. Process steps according to claim 7, the power manager to determine an application associated with the first interface, determine a power consumption mode algorithm associated with the application, and apply the power consumption mode algorithm to the activity measure for the first interface to determine the first power consumption mode.

10. Process steps according to claim 7, the power manager to control the display to display the first interface according to the first power consumption mode and to display the second interface according to the second power consumption mode.

11. Process steps according to claim 7, wherein the first characteristic comprises one or more of: a Z-order of the first interface on the display; a pointer movement within the first interface; an operating system message to draw the first interface; an elapsed time from when the first interface was manipulated by a user; screen size; screen position of an interface; application that owns the screen; history of screen usage; current system location; user ID; ambient light reading; remaining battery life; battery discharge rate; and user power profile; and an elapsed time from when the first interface possessed focus.

12. Process steps according to claim 7,
    wherein the first power consumption mode is associated with one or more of a first brightness, a first resolution, a first color, and a first refresh rate; and
    wherein the second power consumption mode is associated with one or more of a second brightness, a second resolution, a second color, and a second refresh rate.

13. Process steps according to claim 12,
wherein one or more of the first brightness, the first resolution, and the first color is identical to one or more respective ones of the second brightness, the second resolution, and the second color.

14. An apparatus comprising:
a display to display a plurality of interfaces;
a display controller coupled to the display; and
a processor coupled to the display controller, the processor to:
determine a first characteristic associated with a first one of the plurality of interfaces, a second characteristic associated with a second one of the plurality of interfaces, a first power consumption mode for the first one of the plurality of interfaces based at least on the first characteristic, and a second power consumption mode for the second one of the plurality of interfaces based at least on the second characteristic; and
instruct the display controller to control the display to display the first interface according to the first power consumption mode, and to display the second interface according to the second power consumption mode,
wherein the first power consumption mode is different from the second power consumption mode; and
wherein the first interface is displayed at a time that the second interface is also displayed;
the processor to determine an activity measure for the first interface, to determine the first power consumption mode based on the activity measure for the first interface, to determine an activity measure for the second interface, and to determine the second power consumption mode based on the activity measure for the second interface.

15. An apparatus according to claim 14, the processor to determine an application associated with the first interface, determine a power consumption mode algorithm associated with the application, and apply the power consumption mode algorithm to the activity measure for the first interface to determine the first power consumption mode.

16. An apparatus according to claim 14, the processor to determine a power consumption mode algorithm associated with the application, and apply the power consumption mode algorithm to the activity measure for the first interface to determine the first power consumption mode.

17. An apparatus according to claim 14, wherein the first characteristic comprises one or more of: a Z-order of the first interface on the display; a pointer movement within the first interface; an operating system message to draw the first interface; an elapsed time from when the first interface was manipulated by a user; screen size; screen position of an interface; application that owns the screen; history of screen usage; current system location; user ID; ambient light reading; remaining battery life; battery discharge rate; and user power profile; and an elapsed time from when the first interface possessed focus.

18. An apparatus according to claim 14,
wherein the first power consumption mode is associated with one or more of a first brightness, a first resolution, a first color, and a first refresh rate; and
wherein the second power consumption mode is associated with one or more of a second brightness, a second resolution, a second color, and a second refresh rate.

19. An apparatus according to claim 14,
wherein one or more of the first brightness, the first resolution, and the first color is identical to one or more respective ones of the second brightness, the second resolution, and the second color.

20. A system comprising:
a display to display a plurality of interfaces;
a display controller coupled to the display; and
a processor coupled to the display controller, the processor to:
determine a first characteristic associated with a first one of the plurality of interfaces, a second characteristic associated with a second one of the plurality of interfaces, a first power consumption mode for the first one of the plurality of interfaces based at least on the first characteristic, and a second power consumption mode for the second one of the plurality of interfaces based at least on the second characteristic; and
instruct the display controller to control the display to display the first interface according to the first power consumption mode, and to display the second interface according to the second power consumption mode; and
a double data rate memory coupled to the processor to store processor-executable process steps,
wherein the first power consumption mode is different from the second power consumption mode; and
wherein the first interface is displayed at a time that the second interface is also displayed;
the processor to determine an activity measure for the first interface, to determine the first power consumption mode based on the activity measure for the first interface, to determine an activity measure for the second interface, and to determine the second power consumption mode based on the activity measure for the second interface.

21. A system according to claim 20, the processor to determine an application associated with the first interface, determine a power consumption mode algorithm associated with the application, and apply the power consumption mode algorithm to the activity measure for the first interface to determine the first power consumption mode.

22. A system according to claim 20, the processor to determine an application associated with the first interface, determine an activity measure algorithm associated with the application, and apply the activity measure algorithm to the first characteristic to determine the activity measure for the first interface.

23. A method according to claim 1, wherein determining a first characteristic associated with a first interface displayed by a display, and a second characteristic associated with a second interface displayed by the display comprises:
determining a first characteristic associated with a first interface displayed by an organic light emitting diode display, and a second characteristic associated with a second interface displayed by the organic light emitting diode-based display.

24. A method according to claim 1, wherein determining a first characteristic associated with a first interface displayed by a display, and a second characteristic associated with a second interface displayed by the display comprises:
determining a first characteristic associated with a first interface displayed by a display instructed by an operating system, and a second characteristic associated with a second interface displayed by the display instructed by the operating system.

25. A method comprising:
- determining a first characteristic associated with a first interface displayed by a display, and a second characteristic associated with a second interface displayed by the display; and
- determining a first power consumption mode for the first interface based at least on the first characteristic, and a second power consumption mode for the second interface based at least on the second characteristic,
- wherein the first power consumption mode is different from the second power consumption mode; and
- wherein the first characteristic comprises one or more of: a Z-order of the first interface on the display; a pointer movement within the first interface; an operating system message to draw the first interface; an elapsed time from when the first interface was manipulated by a user; screen size; screen position of an interface; application that owns the screen; history of screen usage; current system location; user ID; ambient light reading; remaining battery life; battery discharge rate; and user power profile; and an elapsed time from when the first interface possessed focus.

26. Processor-executable process steps embodied in a medium, the process steps comprising steps to provide:
- an interface monitor to determine a first characteristic associated with a first interface displayed by a display, and to determine a second characteristic associated with a second interface displayed by the display; and
- a power manager to determine a first power consumption mode for the first interface based at least on the first characteristic, and to determine a second power consumption mode for the second interface based at least on the second characteristic;
- wherein the first characteristic comprises one or more of: a Z-order of the first interface on the display; a pointer movement within the first interface; an operating system message to draw the first interface; an elapsed time from when the first interface was manipulated by a user; screen size; screen position of an interface; application that owns the screen; history of screen usage; current system location; user ID; ambient light reading; remaining battery life; battery discharge rate; and user power profile; and an elapsed time from when the first interface possessed focus.

27. An apparatus comprising:
- a display to display a plurality of interfaces;
- a display controller coupled to the display; and
- a processor coupled to the display controller, the processor to:
  - determine a first characteristic associated with a first one of the plurality of interfaces, a second characteristic associated with a second one of the plurality of interfaces, a first power consumption mode for the first one of the plurality of interfaces based at least on the first characteristic, and a second power consumption mode for the second one of the plurality of interfaces based at least on the second characteristic; and
  - instruct the display controller to control the display to display the first interface according to the first power consumption mode, and to display the second interface according to the second power consumption mode,
- wherein the first power consumption mode is different from the second power consumption mode; and
- wherein the first characteristic comprises one or more of: a Z-order of the first interface on the display; a pointer movement within the first interface; an operating system message to draw the first interface; an elapsed time from when the first interface was manipulated by a user; screen size; screen position of an interface; application that owns the screen; history of screen usage; current system location; user ID; ambient light reading; remaining battery life; battery discharge rate; and user power profile; and an elapsed time from when the first interface possessed focus.

* * * * *